March 31, 1970  G. C. DEVOL  3,503,527
ARTICLE TRANSFER AND ORIENTING MEANS
Filed May 8, 1967  4 Sheets-Sheet 1

INVENTOR.
GEORGE C. DEVOL
BY *Paul S. Martin*
ATTORNEY

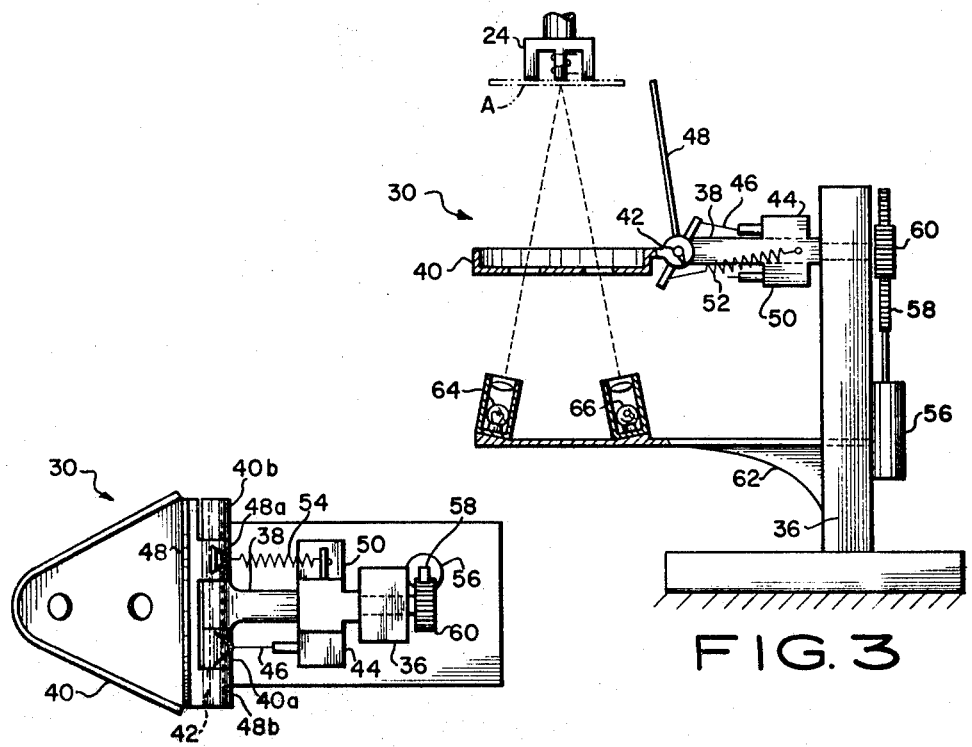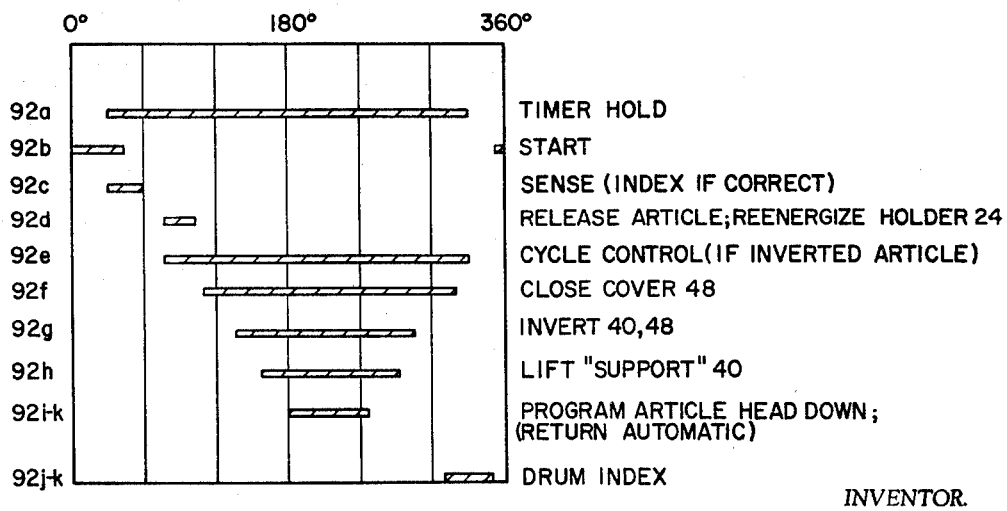

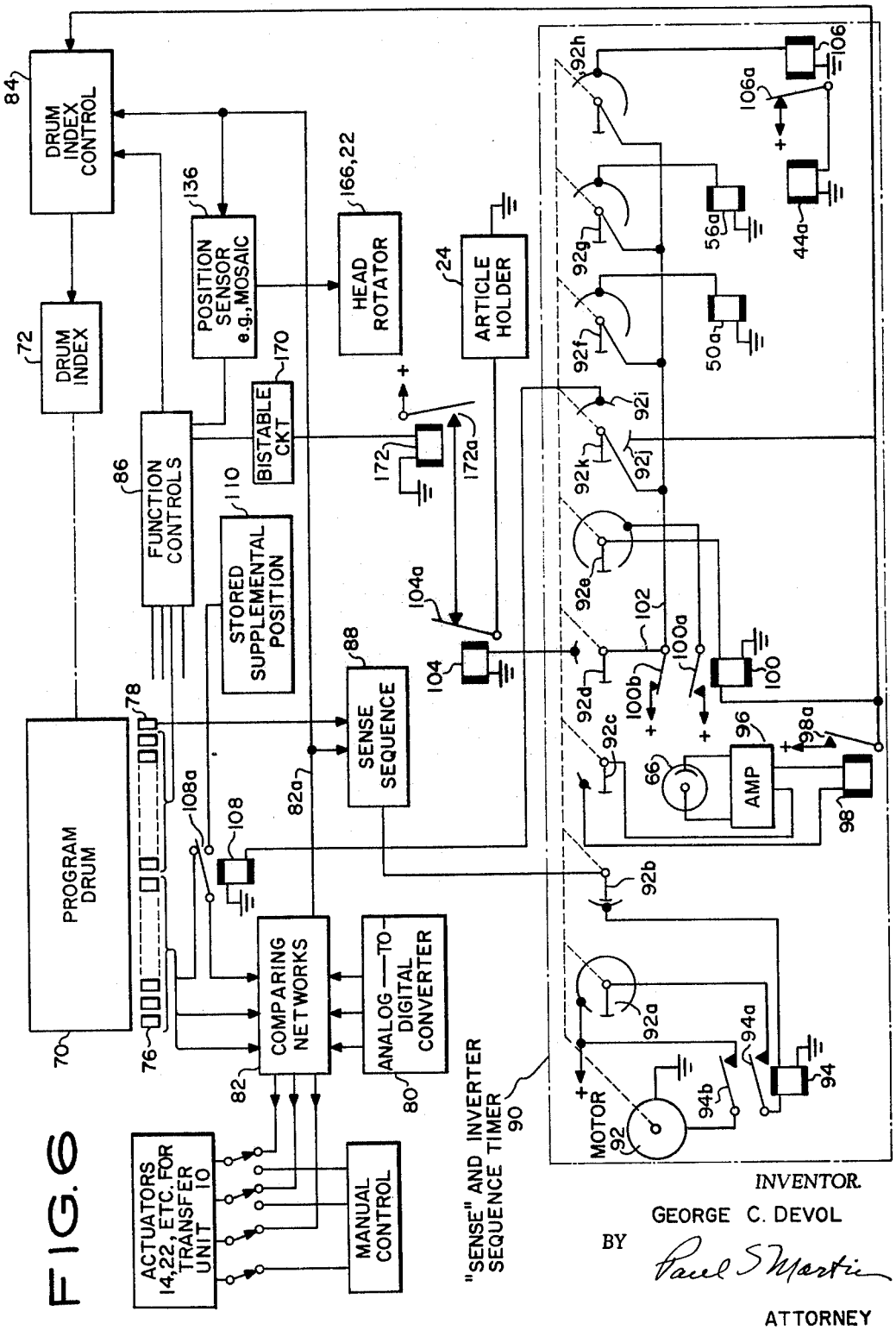

March 31, 1970  G. C. DEVOL  3,503,527
ARTICLE TRANSFER AND ORIENTING MEANS
Filed May 8, 1967  4 Sheets-Sheet 4

INVENTOR.
GEORGE C. DEVOL
BY *Paul S. Martin*
ATTORNEY 3,503,527
ARTICLE TRANSFER AND ORIENTING MEANS
George C. Devol, Box 1273, Greenwich, Conn. 06830
Filed May 8, 1967, Ser. No. 636,999
Int. Cl. B65g 47/92, 47/24
U.S. Cl. 214—1                                    12 Claims

ABSTRACT OF THE DISCLOSURE

This invention relates to an article transfer apparatus that picks up an article at a supply point, transfers it to a preliminary orientation station wherein the article is tested for proper "right-side up" attitude and, if the article should be inverted, automatic means corrects this factor in the orientation of the article. In either case the article is carried to an orienting station where it is adjusted into the desired location and relationship to the article holder of the article transfer apparatus that, when it is delivered at a receiving station, it will be in a precisely prescribed location.

---

The present invention relates to automatic article orienting apparatus.

A broad object resides in providing apparatus and methods for seizing articles available at the supply point in random attitudes and delivering such articles to a receiving means in precise predetermined orientation of each article relative to the receiving means.

A further object of the invention resides in providing article transfer apparatus with a means for testing articles held thereby and, in case the articles are inverted as compared to the desired attitude, for correcting the articles to the right-side-up attitude.

A further object of the invention resides in providing a method and means for correcting the orientation of articles carried right-side-up by article transfer apparatus to assure delivery of the articles in precise predetermined orientation.

The illustrative embodiment that achieves the foregoing and other objects includes article transfer apparatus that picks up an article at a supply point, transfers it to a preliminary orientation station wherein the article is tested for proper "right-side-up" attitude and, if the article should be inverted, automatic means corrects this factor in the orientation of the article. In either case the article is carried to an orienting station where it is adjusted into the desired location and relationship to the article holder of the article transfer apparatus so that, when it is delivered at a receiving station, it will be in a precisely prescribed orientation.

The article transfer apparatus in the embodiment of the invention described in detail below is ideally of a type having the capacity of being "taught" to operate through any desired arbitrary sequence of motions. Article transfer apparatus of this class is shown and described in my Patent Nos. 2,988,237 issued June 13, 1961; 3,279,624 issued Oct. 18, 1966; 3,251,483 issued May 17, 1966; and 3,306,442 and 3,306,471 both issued Feb. 28, 1967. In a less flexible form, the article transfer apparatus in the illustrative embodiment can be constructed for carrying out prescribed motions as by means of cams, indexing mechanisms and so on.

The illustrative embodiment of the invention which is shown in the drawings includes a means at a first station for testing the article for the desired right-side-up attitude. If correct, the transfer apparatus carries the article directly to the next station. If the article is found to be upside down, the article holder releases the article to an automatic inverter and again seizes the article. Thus, the transfer apparatus always carries articles right-side-up to the next station at which the final position-adjustment part of the orientation of the articles is established.

The nature of the invention and its further objects, advantages and novel features will be more fully appreciated from the following detailed description of the illustrative embodiment which is shown in the accompanying drawings forming part of the disclosure. In the drawings:

FIG. 3 is an elevation, shown partly in cross-section, of the article testing and inverting mechanism of FIG. 1;

FIG. 4 is a plan view of the apparatus of FIG. 3;

FIG. 5 is a timing chart of timing contacts in the circuit controlling the apparatus of FIGS. 3 and 4;

FIG. 6 is a block diagram including electrical circuit details of the control and coordinating circuit of the complete apparatus in FIG. 1.

Figure 1:
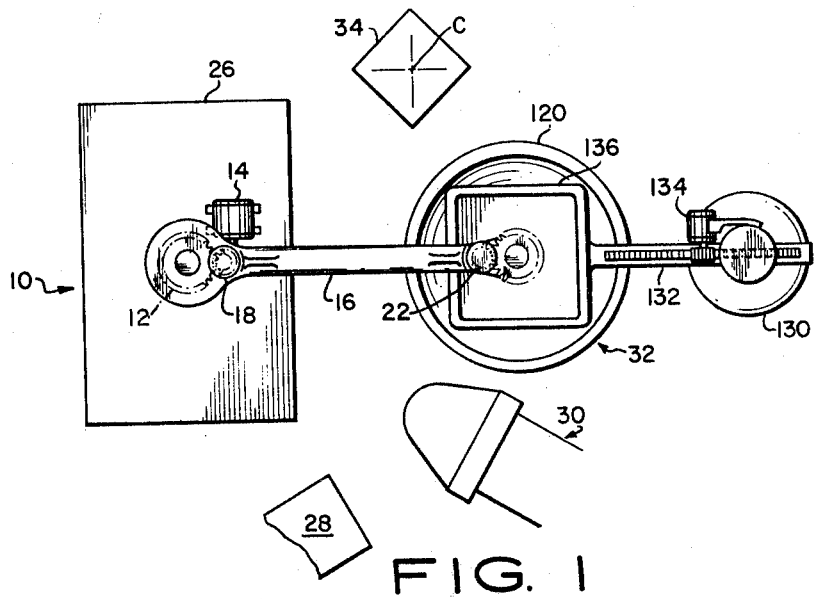
FIG. 1 is a partly diagrammatic plan view of the novel article-orienting transfer apparatus embodying various features of the invention.
Figure 2:
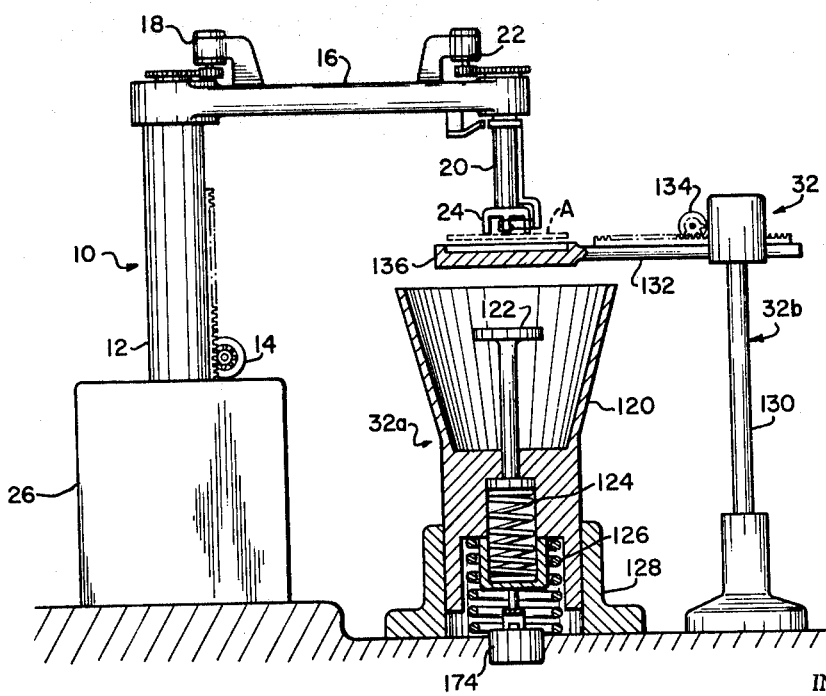
FIG. 2 is an elevation of the article-transfer apparatus and the position-adjusting mechanism of FIG. 1, some parts being shown in cross-section.

Referring now to the drawings, an article transfer unit 10 in FIGS. 1 and 2 includes a vertical post 12 that is reciprocated vertically by a motor 14. An arm 16 is rotatably mounted on post 12 and is operated in a wide arc about that post by a power actuator 18. Motor 14 and actuator 18 may be electric motors, hydraulic actuators, or the like. At the free end of arm 16, remote from post 12, there is a spindle 20 driven by motor 22 through suitable gearing. Spindle 20 carries a depending article holder 24, illustrated as an electromagnet, for holding and releasing a flat article. An electromagnet is suitable for use with articles of magnetic material, but it will be appreciated that vacuum pick-up heads and the like may be used in place of the electromagnet for articles of magnetic material as well as other materials.

The article transfer apparatus shown includes three degrees of freedom which are sufficient for this embodiment of the present invention. Post 12 is capable of vertical reciprocation for moving the article-holding head 24 to different levels; arm 16 is effective for swinging the article-holding head 24 in a circular path, and shaft 20 is rotatable about its axis. Other motions could be substituted, as by moving pedestal 26 bodily along a straight or curved track instead of swinging arm 16, in order to reach the several stations to be described. Furthermore, other motions may be added for additional degrees of freedom in adapting the article transfer apparatus to more general purposes. For example the apparatus in my U.S. Patent No. 3,306,471 may be used.

Pedestal 26 of the article transfer unit contains program control means for causing the post 12 and the arm 16 to move through a sequence of positions with great accuracy, in accordance with a pre-recorded program. For example, suitable program control apparatus for controlling the motions of post 12 and arm 16 is shown in each of my patents mentioned above.

The article-transfer apparatus 10 is only part of the whole apparatus in FIG. 1 for picking up a single unoriented article and transferring it, oriented, to a delivery station. The article is provided at a supply point 28, which may be the delivery end of a chute or a conveyor, or a tote box or the like. One article is picked up at supply point 28, and transferred to a sensing and inverting apparatus 30. This apparatus will be described in greater detail below and is shown in FIGS. 3 and 4, but for the present it will be understood that apparatus 30 includes means for sensing the exposed face of an article carried by the pick-up head 24 to apparatus 30; and in the event that the article is not properly supported but is upside-down, apparatus 30 includes means for receiving the article from the pick-up head, inverting it, and presenting it to the pick-up head right-side-up in readiness for the next motion.

After leaving the supply point 28 and passing the sensing and inverting apparatus 30, arm 16 of the article-transfer unit sweeps to apparatus 32, for adjusting an article carried by the pick-up head so that, when arm 16 sweeps from apparatus 32 to the receiving apparatus 34 in a programmed motion, the article will be ready for accurate, controlled deposit. Receiver 34 may be a machine tool in which the article is to be processed further, or it may be an assembly fixture in which the oriented and transported article is received, either as a start of an assembly or as an added part in a previously incomplete subassembly. In any event, the overall effect of the apparatus as thus generally described is to deliver an article to a receiver with predetermined orientation that is established accurately and automatically, despite random disposition of the article at the supply point.

RIGHT-SIDE-UP DETECTOR AND INVERTER

Sensing and inverting apparatus 30 is shown in FIGS. 3 and 4. The sensing and inverting apparatus 30 includes a base or support 36 which carries an arm 38 for rotation about a horizontal axis in a bearing at the top of support 36. At the left-hand end of arm 38 as viewed in FIG. 3, there is a support plate 40 that is mounted for limited pivoting about a horizontal shaft 42 that extends transversely through an end portion of arm 38. Hubs 40a and 40b rotatable on shaft 42 are rigidly fixed to support plate 40. Actuator 44, for example an electromagnet or an electrically controlled pneumatic or hydraulic device, is connected by a cable 46 to hub 40a. The actuator is arranged to lift support plate 40 to its generally horizontal position as illustrated when the actuator is in its extreme operated position illustrated, i.e., drawing cable 46 to the right. Cover plate 48 also has a pair of bearing hubs 48a and 48b on shaft 42. Actuator 50, like actuator 44, is fixed to rotatable arm 38. A cable (not shown) extends from actuator 50 to hub 48a and a tension spring 54 is secured to hub 48a at one extremity and to arm 38 at its opposite extremity for biasing cover plate 48 into the position illustrated in FIG. 2 when actuator 50 is not energized. A similar spring 52 is included to complement actuator 44. Spring 52 is effective to swing support plate 40 to a position remote from plate 48 when actuator 44 is deenergized. This is a slant position resembling the position of plate 48 in FIG. 3. As will be seen later, support plate 40 does not move to its slant position in the normal position of shaft 38 but, instead, the slant attitude of plate 40 is assumed when arm 38 has been rotated 180 degrees about its axis. Support plate 40 would then be elevated and in a position corresponding to that occupied in FIG. 3 by cover plate 48.

A reciprocating actuator 56 having an internal return spring is secured to frame 36. Rack 58 is operated by actuator 56, and rotates pinion 60 that is fixed to a shaft extension of arm 38, the parts being in the position illustrated when actuator 56 is deenergized. When actuator 56 is energized, arm 38 is rotated 180 degres about its horizontal axis so that support plate 40 is inverted. At that time plate 48 is horizontal.

When articles carried by head 24 of the article transfer apparatus 10 are wrong-side-up, they are deposited by head 24 on support 40. For inverting an article, head 24 is caused to release the article which drops on support plate 40. Cover 48 swings down on the article, and arm 38 is rotated 180 degrees about its horizontal axis. Then, with the article resting on cover plate 48, support plate 40 is elevated away from the article so as to expose the article. Head 24 can then be programmed down, the article seized, and the head 24 is returned to the position illustrated under program control.

Frame 36 of apparatus 30 has a bracket 62 for supporting a directed-beam light source 64 and a sharply directional photocell unit 66. Elements 64 and 66 are supported in a low position so as not to interfere with plates 40 and 48 when arm 38 is rotated. Unit 64 is arranged to direct a beam against the lower surface of an article carried by head 24. The reflected beam will be sensed by photocell unit 66. The articles will be prepared so that the top and bottom surfaces of the article have widely differing light-reflecting characteristics. For example, if the articles do not normally have contrasting surfaces, one face of the article may be coated with a dark-blue lacquer such as is commonly used in machine shop practice. It may be considered that when the dark-blue surface faces downward, giving little if any reflection, the article is correctly oriented with its right side up. When the photocell detects this condition, the inverting apparatus is not caused to cycle, but instead the article-transfer apparatus proceeds to its next station without delay. If the photocell detects the bright surface facing downward, then that sensed condition is caused to modify the operation of the article-transfer unit, by causing it to drop the article carried by the head 24, wait for the inverting apparatus to complete its operation, and then to cause the pick-up head 24 to reengage the article before proceeding to the next station.

CONTROL APPARATUS OF UNITS 10 AND 30

The apparatus thus far described is provided with control means as shown in FIG. 6. A program drum 70 is mounted for rotation about a horizontal axis, and can be moved stepwise by drum indexing means 72, diagrammatically illustrated. A series of magnetic recording and pick-up units 76 is disposed opposite the left-hand portion of drum 70 and a further series of pick-up and recording heads 78 is disposed opposite the right-hand portion of drum 70. When drum 70 is at rest in any one position, heads 76 and 78 are disposed opposite respective portions of the drum which, collectively, may be called a "slot." When drum 70 moves through a succession of such positions, each head 76 and each head 78 senses a circular sequence of positions called a "track." Three groups of heads 76 are provided in sufficient number to constitute a binary-code representation of all of the significant positions that can be assumed by post 12, by arm 16, and by spindle 20. In general-purpose article-transfer apparatus using this type of control, groups of heads 76 are included for each degree of freedom. Pick-up heads 78 are provided for various function controls. For example, respective heads 78 can be identified with controlling the speed and direction of travel of vertical post 12 and of horizontally swingable arm 16. As a specific example, a function control head 78 is provided for rendering apparatus 30 effective. Additionally, a sensing head 78 is provided to control article holder 24 for seizing and for releasing an article at various times in the sequence of operations in the apparatus.

In the illustrative form of article transfer apparatus 10, each of the motions of which the article-transfer apparatus is capable, or degrees of freedom, involves a corresponding analog-to-digital converter for representing the vertical positions of the post, the angular positions of arm 16, and the rotational positions of spindle 20. See my above-mentioned Patent No. 3,306,471 for details of suitable apparatus of this type. These analog-to-digital converters 80 (FIG. 6) provide output that is compared by networks 82 with the particular destination instructions sensed by pick-up heads 76 in any particular slot of magnetic drum 70. Alternatively, by known programming means, the numerical extent of mismatch in unit 82 between the analog-to-digital converter 80 and the input from position-code heads 76 can be utilized to provide direction and speed control, the successive digital values in the converters being related in numerical value to successive positions. When the positions of the analog-to-digital converters 80 agree with the instructions of pick-up heads 76, then ordinarily the program drum is to index so as to present its next position-instruction and function-instruction slot to heads 76 and 78. However, before this occurs, a function may be required to take place; and for this reason, output line 82a of the comparing networks provides only one of the two criteria for drum index control device 84 to be operative. Various function controls 86 that are initiated in operation by heads 78 also provide output at each slot of the drum for suppressing advance of the drum until some function is carried out while the article-transfer apparatus remains in the position reached under control of the program control means 76, 80 and 82. Examples of such function control are more fully illustrated in my Patent No. 3,306,471.

In the present illustrative apparatus, it may be assumed that the article-transfer unit has picked up an article and has advanced to the position represented in FIG. 3. At this time, the output of comparing networks 82 shows correspondence between the position of the "slot" opposite heads 76 and the output of the analog-to-digital converters 80, the head 24 having reached the desired position. One of the function-control pick-up heads 78 senses a control condition of magnetization of drum 70. Units 78 and 82 are then effective to cause "sense" sequence unit 88 to provide a momentary output pulse. Sequence timer 90 is initiated in operation by unit 88. Timer 90 includes a motor 92, a holding relay 94, and a series of motor-driven timing contacts 92a, 92b . . . 92h, and including further an arm 92k that cooperates with stationary contact segments 92i and 92j. The timing of these contacts is represented in FIG. 5.

In response to output from unit 88, relay 94 is energized and a holding circuit is established for relay 94 through relay contacts 94a and motor-operating contacts 92b. Contacts 92a serve to interrupt the holding circuit for relay 94 for interrupting motor operation of the timing contacts at the end of one complete rotation.

Near the start of the timing cycle, contacts 92c close to enable the output of photocell 66 to control connection of amplifier 96 to relay 98 if, and only if, the article carried by the pick-up head is right-side-up. When this occurs, relay contacts 98a close and cause drum index control means 84 to advance the program drum, without waiting for sequence timer 90 to complete its cycle. This causes the arm 16 to advance from apparatus 30 to apparatus 32 (FIG. 1). At the same time, contacts 98e energize relay 100 for establishing a relay holding circuit including contacts 100a and timing contacts 92e. The latter contacts open the holding circuit near the end of the sequence timer cycle. When an article is right-side-up, and relay 100 is energized, another pair of relay contacts 100b open and disconnect line 102 from the input power terminal. In the event that photocell 66 detects an article wrong-side-up, then relay 100 is not energized and contacts 100b stay closed so that wire 102 is energized.

Upon detection of an article wrong-side-up, so that relays 98 and 100 remain deenergized, relay 104 is energized upon closing of timer contacts 92d for opening contacts 104a. This deenergizes the article-holding electromagnet 24 so that the article drops from head 24 to support plate 40 (FIG. 3). Moments later the head 24 is again energized and in condition to seizing an article.

Further rotation of the sequence timer 90 causes contacts 92f to close, and thereby causes control 50a of actuator 50 to swing cover plate 48 down over the previously dropped article on support plate 40. Thereafter, contacts 92g close and energize control 56a of inverter actuator 56 that rotates arm 38 180° about its horizontal axis and leaves the article resting on cover plate 48. Next, contacts 92h close and energize relay 106 so as to open the normally closed contacts 106a and deenergize the control 44a of actuator 44 that holds support plate 40 horizontal. Support plate 40 is accordingly raised to the position occupied in FIG. 3 by cover plate 48. At this point, the article has been inverted and it is exposed to access by head 24. Wiping contact 92k engages contact segment 92i, thereby energizing relay 108. When this occurs, the connection of that portion of the comparing networks 82 which is identified with the vertical travel of post 12 is broken by relay contacts 108a and that vertical-travel portion of the comparing networks is switched to stored supplemental position representing means 110. Normally, the storage in unit 110 will represent a position for head 24 which is down very close to an article on the horizontal-and-inverted cover plate 48. Head 24 moves from its position in FIG. 3 to the lowered position very close to the article as dictated by the supplemental position storage 110. By this time, holding electromagnet 24 has been reenergized. The article on cover plate 48 is thus seized by head 24. When contact 92k moves out of contact with segment 92i, relay 108 is deenergized and contacts 108a resume their initial position. Post 102 is accordingly restored to its elevated position under control of the program-drum position instruction sensed by the related pick-up heads 76.

Continued rotation of the sequence timer 90 causes contact 92j to be energized, activating the drum index control to advance unit 10 to apparatus 32 under control of program drum 70. Plate 40 is restored to its generally horizontal position when contacts 92h open and contacts 106a close; actuator 56 is deenergized and shaft 38 is spring-restored to its starting position in FIG. 3; and plate 48 is again raised in readiness for the next cycle of operation.

The foregoing description of the operation of the photocell sensing element and the inverter demonstrates that the sequence of motion instructions as established by drum 70 is followed without change in the case of an article carried right-side-up by the article-holding head 24. The sequence of programmed operations of drum 70 is modified in the case of an article detected as being wrong-side-up. Head 24 waits for the article to be inverted by the article-inverting mechanism; the vertical motion of the article-transferring apparatus is placed under control of a supplemental stored position memory 110 for lowering the head 24 by moving post 24 down; and as soon as head 24 has moved low enough to seize the article on the inverter, the head 24 is raised to the initial position previously dictated by the program drum.

From the foregoing it is seen that arm 16 advances head 24 to apparatus 32 under program control immediately following detection of an article right-side-up, and arm 16 carries head 24 to apparatus 32 after a delay in case an article is found to be wrong-side-up, the delay allowing head 24 and apparatus 30 to cooperate in inverting the article.

ARTICLE CENTERING AND POSITIONING

Apparatus 10 next operates under control of the program control means in FIG. 6 to advance arm 16 into the position shown in FIG. 2, adjacent the apparatus 32. This includes an article-centering means 32a and a position-sensing means 32b.

Below article-holder or head 24 which carries article A there is a means 32a which shifts article A laterally so that it is contained in a circle of minimum size appropriate to circumscribe the article. All such circles for articles of different sizes have a common center or axis. This is called a centering device, acting to shift each article into position such that the article is contained in a minimum-size circle whose center is at an established location. Centering device 32a includes a conical member 120 whose inside wall diverges toward the article holder, and an article support 122 that has a vertical slide guide in the base of member 120. Spring 124 biases article support 122 upward, and spring 126 biases conical member 120 upward. Fixed tube 128 forms a vertical slide guide for member 120.

Sensing means 32b includes a standard 130 and a horizontal arm 132 that is movable horizontally between the projected position shown in FIG. 2 and a retracted position, clear of the space between the article holder 24 and conical member 120. A motor 134 drives member 132 horizontally for example by a rack and pinion.

Figure 7:
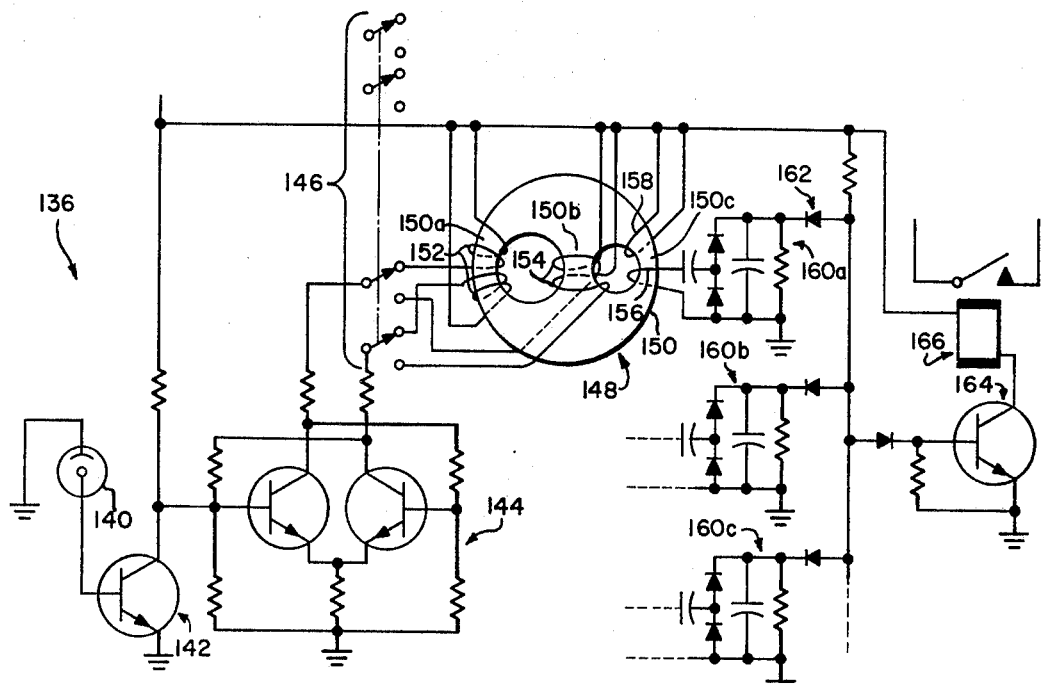
FIG. 7 is the wiring diagram of a block in the diagram of FIG. 6.

Arm 132 carries the sensing means 136 of a pattern-recognition device. In a simple form, this may be a group of photocells that are indivdually adjustable to positions inside and outside the outline of the article A, so connected by "and" gates in an analyzing circuit that a recognition signal is produced when all the photocells that should be outside the outline of the article are exposed to the ambient light while, at the same time, all the photocells inside the outline are concealed by article A from ambient light. In another simple form, this may be a "negative" mask having an aperture that exactly matches the article so that some ambient light will reach a photocell below the mask in every case when the centered article is rotationally misaligned with the mask. Detection of proper orientation of the article then occurs when the article and the mask of the sensing device are in alignment. FIG. 7 illustrates a further, specially attractive form of article-position sensing and recognition device that is specially attractive in that it is "teachable" for recognizing any of a wide range of article shapes.

In FIG. 7 there is a photocell 140 disposed in sensing unit 136 (FIG. 2). Photocell 140 represents only one of a whole matrix of photocells that make up the sensing means 136. The photocells may be arranged as a rectangular matrix or as a concentric-circle matrix, or in any other expedient pattern. Photocell 140 is connected via amplifier 142 to a symmetrical two-sided circuit 144 whose halves produce polarized output at selector switch 146 having as many pairs of contacts as there are photocells in the matrix. A magnetic storage device 148 includes a storage core 150 having two apertures defining three flux paths 150a, 150b and 150c. Two "teach" coils 152 impose opposite polarities of magnetization on the magnetic storage flux path 150a when switch 146 connects circuit 144 to these coils. The polarity depends upon whether the photocell 140 is dark or illuminated. When switch 146 is moved to its reverse position, coils 154 on "sensing" flux path 150b are connected to circuit 144. Output coil 156 linking flux path 150c provides an output signal in response to interrogating signal pulses on coil 158 (which also links flux path 150c) whenever there is a match in the "signal" flux in path 150b and the storage flux in path 150a. Such signals are rectified in an output circuit 160a having a short time-constant. Like circuits 160b and 160c . . . derive the output from circuits connected to other photocells of the matrix. A diode gate 162 provides control input to the amplifier 164 and output relay 166 only when the photocell output via switch 146 to coils 154 of all the storage-and-comparison units 148 demonstrates agreement between the article (as sensed by all the photocells 140 of the matrix) and the storage information in flux paths 150a which represents the desired position of the article.

Before the apparatus is set into automatic operation it is necessary to enter into the memory of the matrix a record of the desired article position. The memory is represented by all the storage flux paths 150a related to the respective photocells 140 of the matrix. In order to do this, an article A is placed on support 122. Head 24 is aligned with the axis of conical member 120. Head 24 is moved downward to depress the article and support 122. The article is automatically centered in member 120, by shifting laterally until it fits into a minimum circular outline that can contain the article. The coordinates of this position are entered in a "slot" of the program drum 70 (FIG. 6) by known recording means. The apparatus 10 is then operated to energize the pick-up means 24 for seizing the article A, to lift head 24, to swing the axis of head 24 to center C of a minimum-size article-containing circle at the article receiver 34, and to rotate the head 24 until the article is in the desired orientation relative to the receiver. The coordinates of post 12 and arm 16 in that position are entered into an appropriate "slot" of drum 70. For this purpose the drum will be indexed under manual control. Head 24 is then moved back to the position aligned with the axis of member 120 and member 136 is projected under the article carried by head 24. During the sweep of arm 16, head 24 is fixed relative to arm 16. Head 24 may be adjusted to place article A close to or against the sensing unit 136. With switch 146 moved to the position shown in FIG. 7, energization of the circuit containing coils 152 will cause the various flux paths 150a to be magnetized with a polarity according to the "light" or "dark" condition of the related photocells 140 of the photocell matrix, in accordance with the photocells exposed or concealed by the article A. Switch 146 is then reversed from the "teach" position shown in FIG. 7 to its other or "operate" position.

Other devices and circuits may be used to replace information storage and comparison units 146 in FIG. 7. For example, another form of combined magnetic storage and comparison device that may be used in lieu of device 146 is seized by the article holder. Under further program Devol et al. Also, information storage and comparison circuits other than the magnetic type are also contemplated.

The operation of the entire apparatus may now be considered, including further details of the control circuit in FIG. 6. The "teach" operations described above are performed as a preliminary, recording in various slots of drum 70 the coordinates of the positions to which head 24 is to move and, in addition, making appropriate function control recordings in the same or intervening slots of the drum as may be required to execute the following operations. One such function control, effected under program control by a sensing head 78 and function control circuits 86, is for controlling article holder 24. This particular circuit includes bistable circuit 170 such as a binary counter stage for alternately energizing and deenergizing relay 172. Contacts 172a of this relay are closed to energize article holder 24, subject to interruption by opening of contacts 104a as previously described.

Under program control, head 24 is carried to supply point 28, head 24 is lowered close to an article, and bistable circuit 170 is triggered into its state wherein relay 172 and article holder 24 are energized. An article A is seized by the article holder. Under further program control, head 24 may be raised to remove the seized article from the supply point, and then head 24 is moved to present the article to testing and inverting apparatus 30. The articles are tested for being right-side-up or upside-down. One test that is readily applied is photoelectric, initiated in operation by a functional-control sensing head 78, control circuit 86, and relay 94. The articles are prepared for this test with contrasting top and bottom colors. If an article is right-side-up, the program drum is indexed under control of relay 98 to advance the next program slot into sensing position. If the article requires inverting, the previously described timer unit 90 causes head 24 to release the article for deposit on support 40 of inverter 30 (FIGS. 3 and 4), to close cover 48, to invert the support and cover 40, 48, to lift "support" 40 which has become a cover, to deenergize relay 104 for reenergizing head 24, to lower head 24 under control of storage unit 110 for seizing the article on "cover" 48, and to advance drum 70.

It will be understood that, if there is advance arrangement for the articles presented at supply point 28 to be right-side-up, then unit 30 and its program control means may be by-passed or even omitted.

The next drum slot provides the control indicia for advancing the article A to the position represented in FIG. 2, with spindle 20 aligned with the axis of conical member 120, member 136 being retracted at this time. Downward drive of head 24 carries article A to support 122. Head 24 is deenergized so as to facilitate horizontal shift of the article A. Further downward operation of the head 24 (by program control of the elevation of post 12) causes the article to be contained in a minimum-diameter circle centered along the common axis of member 120 and spindle 20. Further downward movement of head 24 may occur, and would carry member 120 downward too. A limit switch 174 (FIG. 2) may be suitably included in the program-control circuit of motor 14, arresting head 24 after article A is centered.

The next program step causes head 24 to lift article A to the position of FIG. 2, and then a function-control sensing head 78 with a suitable relay control circuit causes motor 134 to advance sensing unit 136 directly under the article. The next function control subjects head rotator 22 to control by sensing unit 136, for example a mosaic of photocells and control circuits as shown in FIG. 7. Rotation of head 24 is interrupted when the article orientation has been perfected as that required to deposit the article A at the delivery point 34 (FIG. 1) by sweep of arm 16 with no change occurring in the head 24 relative to the arm. Indexing of the drum 70 also occurs upon detection of the article A in its desired position. The article is then carried to delivery point 34 and released, under program control.

The foregoing illustrative embodiment involves the angular positioning of the article occurring at the location of the sensing mosaic or other sensor. However, variations are contemplated including the following. Head 34 may start its rotation for scanning at station 32b in a "zero" setting of the digital encoder commonly associated with the rotation of an article holder in article transfer apparatus as in my Patent No. 3,306,471. Here, the zero setting is understood as that which prevails at the time that head 24 is at the receiving station 34 during the preparatory "teaching" operation of the pattern recognition means (FIG. 7) described above. The control output occurring in the routine operation of scanning unit 32b, when the scanned article reaches agreement with the stored pattern, need not be used immediately to stop the article rotation. Instead, a digital value may be read out from the rotational digital encoder of head 24. The digital value may be stored, and used to stop article rotation later, as during the travel of head 24 to receiver 34. For that purpose, the encoder, motor 22 and the digital storage will constitute a digital servo. The arrangement has the advantage of speeding up the overall article transfer and orienting operation by making possible a rapid scanning operation by unit 32b without interrupting article rotation, this rotation being arrested subsequently but before actual delivery of the article to the receiver. This arrangement has the benefit of making possible the use of deceleration techniques of known digital servo devices. Accordingly, it is not an essential of the invention to arrest the article in its desired angular orientation while the article is physically in position at the scanning unit 136.

In the foregoing illustrative embodiments, the sensing elements mentioned are photocells. Various alternatives may be used, such as magnetic, pneumatic, etc., depending on cost, suitability in relation to the article, and so forth. Various other modifications and varied applications of the novel features of the invention will occur to those skilled in the art, and consequently the invention should be construed broadly, in accordance with its full spirit and scope.

What is claimed is:

1. Apparatus for assuring the proper attitude of articles having two sides and available at a given point either wrong-side-up or right-side-up, including article transfer means having an article holder, an article inverter, means associated with said inverter for testing articles presented thereto and responsive differently to wrong-side-up and right-side-up articles and said testing means selectively controlling said inverter to invert wrong-side-up articles, said article transfer means including article holder operating means effective to transfer articles from said supply point to said testing means, and said operating means being selectively responsive to said testing means for causing the article holder to retain and then transfer articles that are right-side-up to a delivery point and for releasing articles that are wrong-side-up to said article inverter and then causing the article holder to retrieve an article after inversion for transfer from the article-inverter to the delivery point.

2. Apparatus for transferring an article from place to place and for adjusting the position of an article to a prescribed angular orientation about an adjustment axis through the article, including an article holder, means for operating the article holder selectively to seize and release an article, automatically controlled means for displacing the article holder to transfer an article from one location to another, and means for rotating the article holder about said axis, means for detecting the angular departure of an article from a prescribed angular position, said last-named means including means for representing the article in the prescribed orientation and means for sensing an article and for comparing the position thereof to the representation of the article position as provided by said representing means, and means responsive to said angular departure detecting means for providing virtually continuously variable angular control of the operation of said article holder by said rotating means to effect rotation of the article holder through an angle corresponding to said angular departure.

3. Apparatus for adjusting the position of articles to a prescribed orientation as set forth in claim 2, said apparatus further including means operable prior to the operation of said rotating means and cooperable with and controlled by the peripheral extremities of an article for adjusting the article so that the article is contained in a minimum-size circle that is centered at a prescribed location.

4. Apparatus for adjusting the position of articles to a prescribed orientation as set forth in claim 2, further including means operable prior to the operation of said rotating means and cooperable with and controlled by the peripheral extremities of an article for adjusting the article relative to the article holder so that the article is contained in a minimum-size circle that is centered at said axis, further including means operable after sensing of the article by the sensing means for causing said article holder to transport the article from said sensing means to a receiver for deposit in the prescribed angular orientation.

5. Apparatus in accordance with claim 2, including means for causing the article holder to rotate an article while in sensing position, and including control means for said article holder rotating means responsive to said angular departure detecting means for effecting controlled angular orientation of said article holder.

6. Apparatus for adjusting the position of articles to a prescribed orientation, including an article holder, means for responding to the position of the article relative to a prescribed position, said responding means including sensing means arranged to coact with an article in sensing position and adapted to provide varied response in dependence on the angular position of the article being sensed, information storage means for representing the prescribed position of the article, and means for comparing the information of the information storage means to the output of the sensing means, means for moving the article holder through a continuous range including said prescribed position, and means responsive to said article-position responding means for controlling the operation of said article holder by said moving means.

7. Apparatus in accordance with claim 6, further including means responsive to the sensing means when exposed to an article in the prescribed position in a preliminary operation of the apparatus, operable to record information in the storage means representing the prescribed position of the article.

8. Apparatus for adjusting the position of articles to a prescribed orientation as set forth in claim 7, wherein said moving means rotates the article holder about an axis, said apparatus further including means operable prior to the operation of said moving means for adjusting the article relative to the article holder so that the article is contained in a minimum-size circle that is centered at said axis.

9. Apparatus for adjusting the position of articles to a prescribed orientation, including an article holder and operating means therefor, means including an article-position sensing device for responding to a prescribed position of the article relative to the sensing device, said operating means including means for moving the article holder relative to the sensing device through a range of positions including said prescribed position, and means responsive to said article-position responding means for controlling the subsequent operation of said article holder by said operating means, further including an article inverter and article-attitude testing means associated therewith, said article-holder operating means including means for presenting an article carried by the article holder to said testing means and for transferring an article from said article holder to said article inverter in case the testing means detects an upside-down article, said article-holder operating means being automatically operable in dependence on the response of the testing means to transfer an article either from the position in which it is tested as aforesaid or from the inverting means to said article-position sensing means.

10. Apparatus in accordance with claim 9, wherein said moving means rotates the article holder about an axis, said apparatus further including means operable prior to the operation of said moving means for adjusting the article relative to the article holder so that the article is contained in a minimum-size circle that is centered at said axis, and wherein said operating means includes means operable after sensing of the article in said prescribed position for transporting said article holder from said sensing device to a receiver while preserving a constant relationship between the article held by the article holder at the sensing device and the position thereof at the receiver.

11. Apparatus for adjusting articles to a prescribed position, including means for centering an article within a minimum-diameter circle centered at a predetermined axis, article position sensing means, means for effecting relative rotation between the sensing means and the article about said axis, and means for providing a control signal upon arrival of the article at said prescribed position relative to said sensing means for controlling said rotation means.

12. Apparatus for adjusting articles to a prescribed orientation in accordance with claim 11, including preliminary means for testing the attitude of each article to determine whether it is right-side-up or upside down, and means for inverting articles found to be upside down for exposure to said sensing means.

References Cited

UNITED STATES PATENTS

| | | | |
|---|---|---|---|
| 3,140,009 | 7/1964 | Wallace | 221—2 |
| 2,933,205 | 4/1960 | MacDonald et al. | |
| 2,968,888 | 1/1961 | Borah | 45—28 |
| 2,988,237 | 6/1961 | Devol. | |
| 3,007,097 | 10/1961 | Shelley et al. | |
| 3,012,651 | 12/1961 | Hawkes. | |
| 3,367,476 | 2/1968 | Aronstein et al. | |

ROBERT G. SHERIDAN, Primary Examiner

FRANK E. WERNER, Assistant Examiner

U.S. Cl. X.R.

214—730